United States Patent [11] 3,602,974

| [72] | Inventor | Albert C. Koett<br>2112 Glenside Ave., Cincinnati, Ohio 45212 |
|---|---|---|
| [21] | Appl. No. | 773,577 |
| [22] | Filed | Nov. 5, 1968 |
| [45] | Patented | Sept. 7, 1971 |

[54] PIERCE NUT FASTENING MEANS AND METHOD
19 Claims, 15 Drawing Figs.

[52] U.S. Cl. .................................................. 29/243.5, 29/432.1
[51] Int. Cl. ..................................................... B23p 11/00
[50] Field of Search ........................................... 29/243.5, 243.51, 432, 432.1, 432.2; 151/41.72, 41.73; 10/86 CL

[56] References Cited
UNITED STATES PATENTS

| 2,652,942 | 9/1953 | Muchy | 29/243.5 X |
| 2,750,660 | 6/1956 | Newcomb | 29/432 |
| 3,014,609 | 12/1961 | Hobbs | 151/41.72 UX |
| 3,091,843 | 6/1963 | Double et al. | 29/432 |
| 3,299,500 | 1/1967 | Double | 151/41.73 X |
| 3,314,138 | 4/1967 | Double | 151/41.72 UX |
| 3,405,436 | 10/1968 | Koett | 29/243.5 X |

Primary Examiner—Andrew R. Juhasz
Assistant Examiner—Leon Gilden
Attorney—Davis, Lucas, Brewer & Brugman ABSTRACT: A pierce nut having a noncylindrical shank is driven through a sheet metal mounting plate into a die so as to excise a slug; further advancement of the nut into the die forces the shank of the nut through a sleeve of the die, to displace metal from the corners of the nut and compact the displaced metal against the mounting plate for securing the nut thereon. Removal of the slug is facilitated by reducing its breadth dimensions within the die cavity, and expelling it with compressed air or by other suitable means.

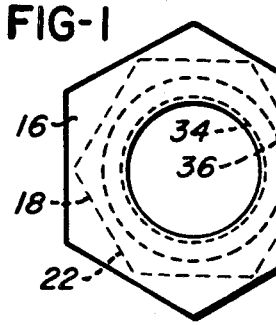
FIG-1
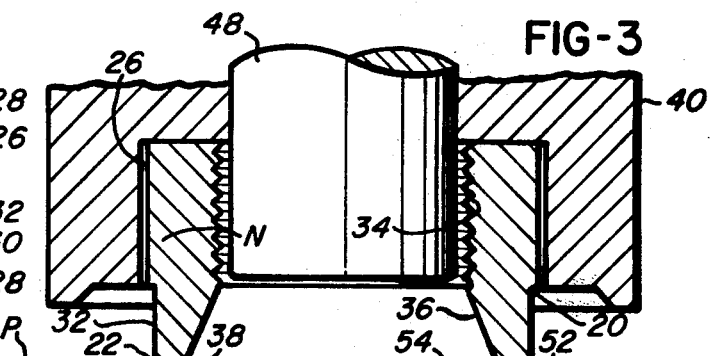
FIG-3
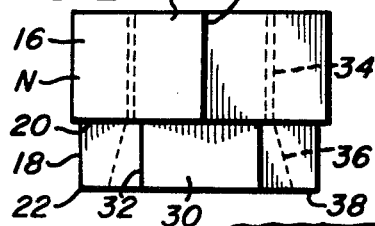
FIG-2
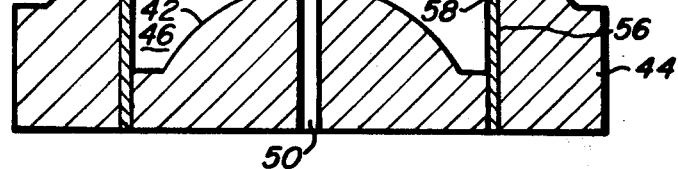
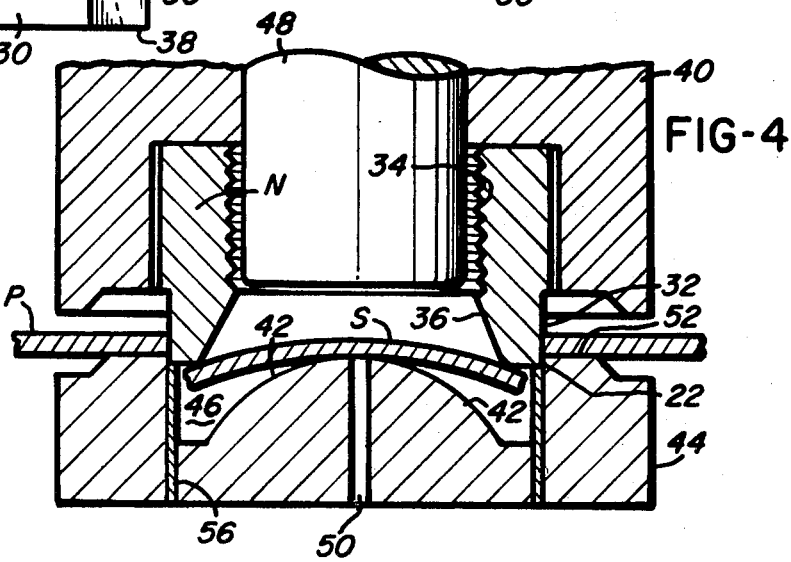
FIG-4
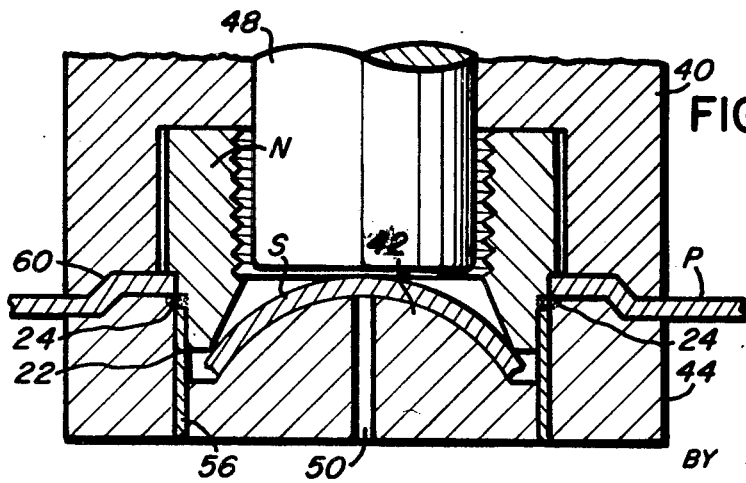
FIG-5
INVENTOR
ALBERT C. KOETT

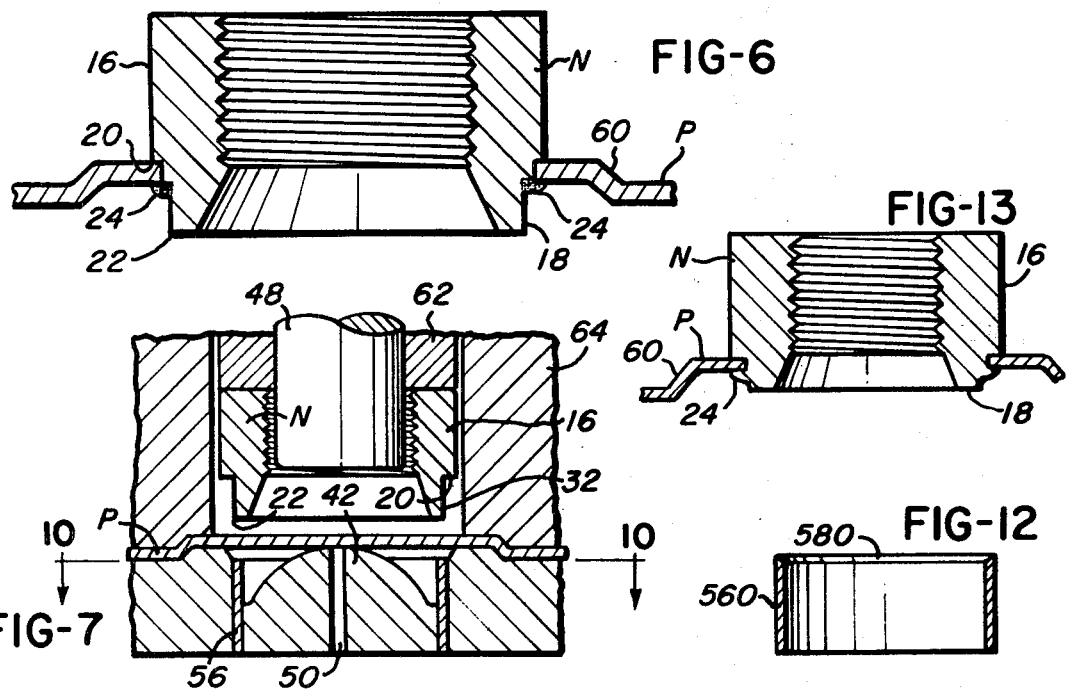
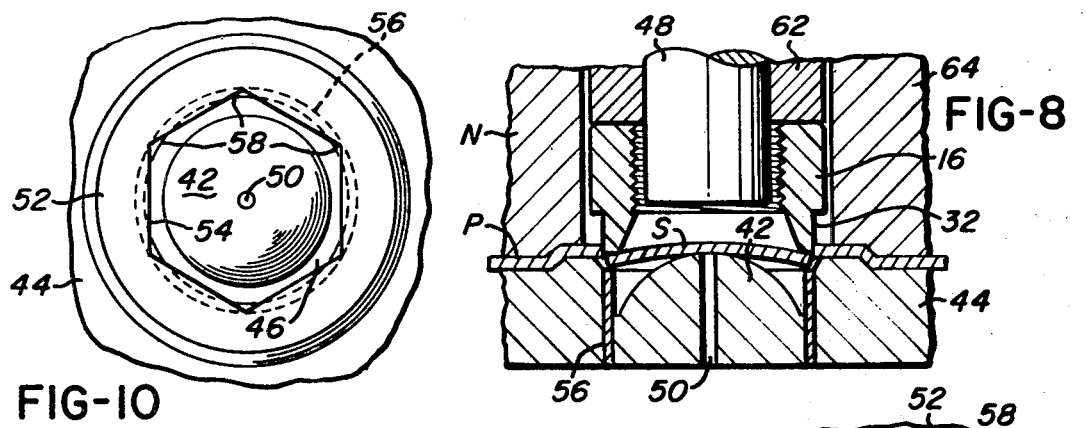
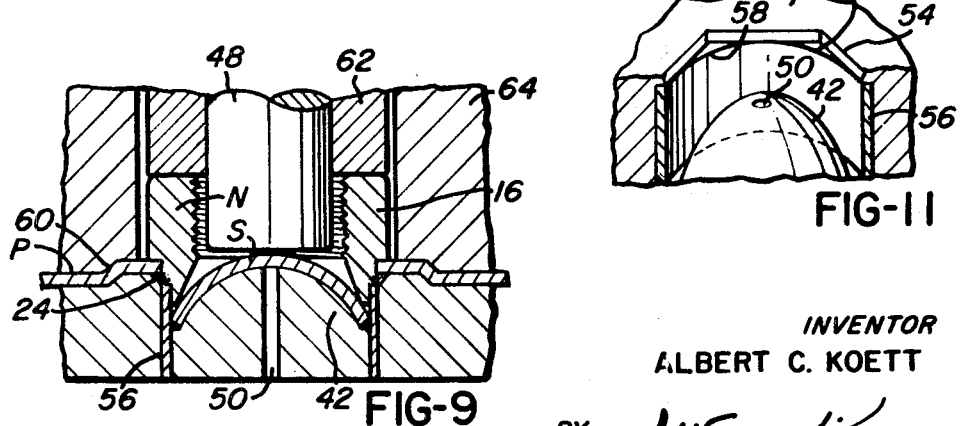

INVENTOR
ALBERT C. KOETT

BY J. Warren Kinney Jr.
ATTORNEY

PIERCE NUT FASTENING MEANS AND METHOD

This invention relates to a pierce nut fastening means and method, wherein a self-piercing nut is driven through a thin metal plate or panel by means of a press member, and during the same operation some of the metal of the nut is displaced and compacted to lock the nut securely to the plate or panel. The procedure requires no advance perforating of the plate, and the mounting of the nut thereon is performed as a single rapid press operation, or as a single, hand tool operation if desired.

An object of the invention is to provide a pierce nut fastening means and method, involving a thin metal plate, whereby fastening of the nut securely upon the plate is accomplished economically with despatch, in a single pressing operation.

Another object of the invention is to provide a method and means of the character stated, which feature unusual reliability, durability, and absence of servicing requirements, so that the process or method may be practiced without interruption for extended periods of time, and with substantial savings of time and labor.

A further object is to provide an improved form of die for the performance of the present method of nut mounting, the die being simple and economical of manufacture, as well as highly serviceable and durable. The foregoing and other objects are attained by the means described herein and illustrated upon the accompanying drawings, in which:

FIG. 1 is an enlarged top plan view of a nut such as may be employed in practicing the present invention.

FIG. 2 is a side elevation of the nut of FIG. 1.

FIG. 3 is a cross-sectional view of the nut in position over a die and a nut-mounting plate, preparatory to driving of the nut through the mounting plate.

FIG. 4 is a view similar to FIG. 3, showing the nut driven through the mounting plate to produce a slug.

FIG. 5 is a view similar to FIG. 4, showing the slug and the nut fully advanced, with the nut attached to the mounting plate by displaced metal from the nut.

FIG. 6 is an enlarged cross section of the completed mounting of a nut upon a plate or panel.

FIG. 7 is a cross section quite similar to FIG. 3, showing a modified form of driving means for the nut to be mounted upon a plate.

FIGS. 8 and 9 are views similar to FIG. 7, showing the nut in two successive stages of advancement in mounting.

FIG. 10 is a view taken on line 10—10 of FIG. 7, looking down into the interior of the cutting and forming die.

FIG. 11 is a fragmentary perspective view partly in cross section, of the die illustrated by FIG. 10.

FIG. 12 is a cross-sectional view of a cylindrical cutter which may be incorporated in the cutting and forming die, the cutter being modified over FIG. 7.

FIG. 13 is a view similar to FIG. 6, showing a modified nut mounting.

Figure 14:
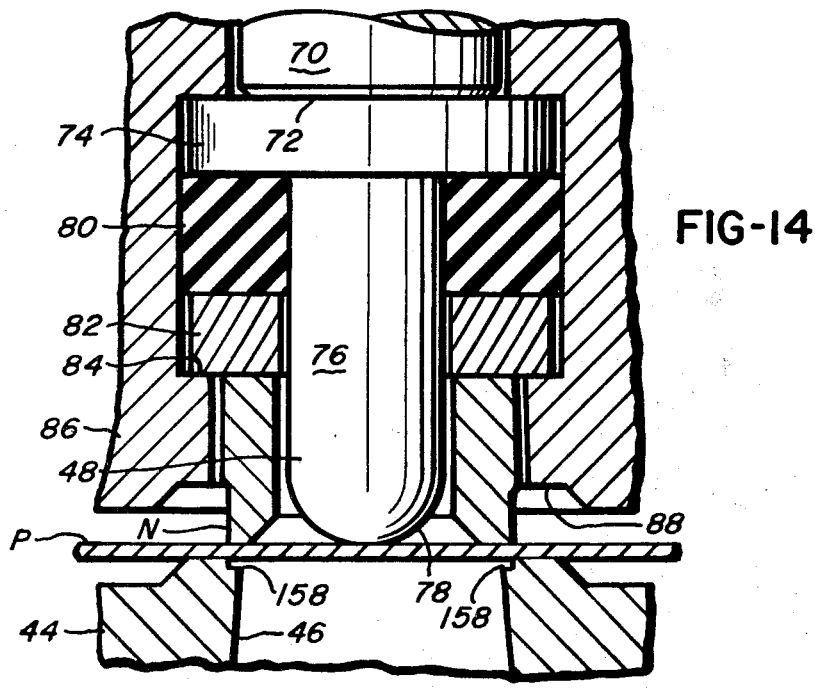
FIGS. 14 and 15 are cross sections showing a modified form of machine for driving the nut through the mounting plate.

In all of the drawing views, N denotes a self-piercing nut, and P denotes a mounting plate or panel upon which the nut is to be securely mounted and locked against relative rotation. Usually the plate is of thin sheet iron or steel, or possibly a plastic or composition material, and the nut is formed of a ductile or malleable metal which, however, is sufficiently hard to pierce the plate when driven against the plate properly supported over a cutting and forming die. The nut may be a high-production part formed inexpensively as by means of an automatic screw machine or a cold heading machine or the like, from mild steel stock or possibly from a nonferrous or ferrous alloy having the required hardness and ductility characteristics mentioned above.

The nut N is necessarily required to have a head 16, and a shank 18 smaller than the head, so that portions of the head provide ledges 20 or support areas against which the plate P may abut after the plate has been pierced or perforated by the leading cutting edges 22 of the nut, (FIGS. 4 and 8), and advanced against the nut head according to FIG. 6. As will be explained in greater detail hereinafter, the plate P is secured against the ledge areas 20 by metallic nubs 24 (FIG. 6), displaced from the shank portion of the nut and compacted against the underface of plate P incident to advancement of the nut.

The head 16 of nut N may be hexagonal, or of other polygonal form, with flat sides 26 and corners 28. The shank 18 may also be hexagonal or of other polygonal form, with shorter flat sides 30 and corners 32. The corners 32 preferably are equidistant from the corners 28, in order to provide substantial areas for the ledges 20 against which the plate P abuts.

The axial bore of the nut may include internal threads 34, and an outward flare or taper 36 terminating at the leading end 38 of the nut which carries the cutting edges 22. Each flat face 30 of the nut shank 18 presents a cutting edge 22, located at the leading end of the nut. Said leading end 38 is adapted to be driven against mounting plate P, FIG. 3, by means of a nut driving member 40 of a press, causing the cutting edges 22 to pierce the plate and excise a slug S according to FIG. 4. As the driving member continues to advance the nut, the slug S becomes arched or convexed over a dome 42 within the die 44, to reduce the breadth dimension of the slug and prevent its binding within the die cavity or slug chamber 46.

Upon full advancement of the nut N and driver 40, FIG. 5, the slug S may conform substantially to the shape of dome 42; then upon withdrawal of driver 40, pilot 48, and workpiece P, N, the slug may be blown from the die cavity by compressed air injected through a passageway 50 formed in dome member 42.

The upper face or work support area 52 of die 44 supports the plate P while Nut N excises the slug S. The slug excised is polygonal, agreeing with the shape of the nut shank and the complementarily shaped entry throat 54 of the die (see FIG. 10). Throat 54 received the leading cutting edges 22 of the nut, with the necessary clearance for effecting excision of slug S.

Beneath the throat 54, the die cavity or chamber 46 is cylindrical, and may be so formed by drilling or boring the die from beneath, the understanding being that dome part 42 is removed for this purpose. The cylindrical bore may approximate in diameter the breadth of the polygonal throat 54 across two opposite corners of the throat. Following the boring operation, a cylindrical hard metal sleeve 56 is pressed into the bore front beneath, with its leading edge 58 disposed beneath the polygonal throat 54 at a distance from the plate-supporting surface approximating the thickness of plate P.

The inside diameter of sleeve 56 is less than the distance across two opposite corners of throat 54, so that the leading edge or ledge 58 of the sleeve is visible from above at each corner area of the throat, according to FIGS. 10 and 11. The edge or ledge 58 at each throat corner is seen to provide an obstruction to advancement of nut N into the slug cavity 46, particularly at the corners 32 of the nut shank. Accordingly, enforced advancement of the nut by driver 40 causes the impact ledges at 58 to shave metal from nut corners 32, and displace the shaved metal against the underface of plate P (FIG. 6), where the displaced metal is compacted tightly against the plate at 24 (FIG. 5) incident to full advancement of the nut shank into the slug opening of plate P.

Upon retraction of the press part or driver 40, the plate P with nut N firmly secured thereon may be withdrawn from the press.

In a modification of the operation above recited, the pierce nut N may be provided initially with a very short shank 18 (FIG. 13), in which case the cylinder or sleeve impact ledges at 58 may swage, rather than shave, the metal of the nut corners 32, thereby to produce the connection illustrated by FIG. 13. The die sleeve, denoted 560 in FIG. 12, may be provided with an inwardly and downwardly sloping leading edge 580, if desired. The inclination of edge 580 relative to the axis of the sleeve, may be of greater or less angularity, depending upon the nature of the metal of nut N, its ductility, and other characteristics. The upper impact edge or ledge 580 may be perpendicular to the sleeve axis, is desired.

The dome section 42 of die 44 is to be tightly fitted within the die cavity, and may be held rigidly in place therein by means of a pressed fit or other expedient. Said section 42 may be utilized as a means for anchoring the die sleeve 56 or 560 within the die cavity, either permanently or in such a manner as to permit the insertion of new sleeves from time to time as the working edges 58 or 580 become worn. Also, it should be understood that dome section 42 might be omitted from the die, if slugs S are to be displaced downwardly through the die cavity. Such downward displacement of the slugs is possible in some instances, particularly when the plate P is soft or of very limited thickness. Slug displacement downwardly may be effected in some instances, by reciprocatory movements of the pilot or nut locator 48 axially of the die cavity.

The plate P is shown embossed at 60 as the result of the press operation; however, it should be understood that the dies need not necessarily be formed to emboss the plate.

In the die set of FIGS. 3, 4 and 5, the driver 40 is of one-piece construction, serving to drive the nut N through plate P and to emboss the plate with a single-press motion. FIGS. 7, 8 and 9 illustrate a different press construction, in which separate press elements 62 and 64 drive the nut, and clamp and emboss the plate, respectively, the movements of parts 62 and 64 being successive rather than in unison. Presses of both types are common in the art, and either may be employed in practicing the present invention.

The primary purpose of making the head of part N polygonal, rather than annular, is to utilize opposite parallel sides of the head 16 as a means of orienting the shank sides and corners of part N with the sides and corners of the polygonal throat portion 54 of die 44, when feeding the parts N to the die. Such orientation while feeding the parts N, might of course be accomplished utilizing the parallel sides or opposite corners of the shank 18, although this might be more difficult of accomplishment. In any event, the feeding of parts N should be performed so as to set part N over the die throat with corresponding sides of both in parallelism, so that proper excision of slug S will result.

Finally, it is pointed out that the internal threads 34 might be omitted from part N, so that part N instead of being a nut, may be considered a grommet or reinforcing insert for a plate perforation. Whether or not the part N carries internal screw threads such as 34, the operation of attaching it to plate P remains the same; that is, the part N is self-piercing, and it furnishes the nubs 24 whereby a rigid connection is made with the plate, all of this being performed as a single-rapid press operation. The press operation is performable either by means of a power press, or a hand press tool.

Earlier herein was mentioned the possibility of displacing the slug S downwardly through the die cavity 46. Means for this purpose is illustrated upon FIGS. 14 and 15, wherein lower die 44 has an open bottom cavity 46 which may be slightly flared outwardly in the downward direction as shown. A reciprocative driven 70 has an end 72 bearing upon the head 74 of a plunger 76, whose free end 78 may be driven against plate P to bulge the plate toward cavity 46 according to FIG. 15. This action results from am initial advancement of driver 70 against plunger head 74.

Plunger head 74 overlies a resilient member 80, which may be a rubberlike clock, or a compression spring if desired, adapted to transmit some of the motion of head 74 to a metallic ring 82. Ring 82 overlies the head of nut N and rests upon the inner annular shoulder 84 of a reciprocative press part 86, which part 86 corresponds to the part 64 of FIG. 7 in that it carries an offset end face 88 for embossing the plate P.

Interiorly of die part 44, near the upper portion of its cavity 46, is an impact ledge 158 adapted to displace and compact the metal of the nut shank corners according to FIG. 13, or to shave the metal and compact it against the underside of plate P according to FIG. 6. Ledge 158 may be formed directly upon the metal of die part 44, or if desired, the ledge may be presented as a sharp edge of a sleeve as explained in the description of sleeve 56 or sleeve 560 of the dies alluded to earlier herein.

Figure 15:
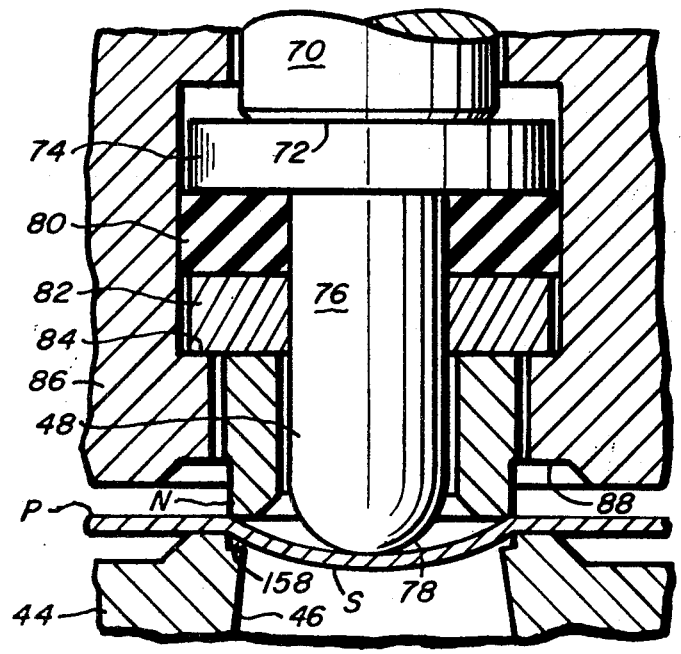

From the foregoing explanation, it will be understood that FIG. 14 discloses the initial disposition of nut N and plate P between the dies of the press. Driver 70 then begins to advance (FIG. 15), causing plunger end 78 to form a concavity in plate P, while plunger head 74 compresses the resilient block 80. By the time block 80 is compressed to the extent of FIG. 15, its density is increased sufficiently to transmit lowering motion to ring 82, which in turn effects a downward advancement of nut N and press part 86, the latter being responsive to force imposed upon shoulder 84. As nut N advances, it shears a slug from plate P, while the rounded plunger end 78 continues to concave the slug area until the diameter of the slug is so reduced as to pass downwardly through die cavity 46.

Continued advancement of the press part 86 causes face 88 to emboss the plate P. Also, the nut N continues its advancement, causing the impact ledges 158 to mutilate and compact the shank corners of the nut against the underface of plate P, to effect a firm mounting of the nut upon the plate as previously explained. The impact ledges may displace metal either by swagging or by shaving the nut corners, as already explained in describing FIGS. 6 and 13.

Upon completion of the nut and plate connection, the nut leaves the upper die part 86 as part 86 and its companion parts 76 and 70 return to the initial elevated position of FIG. 14 in readiness for accommodating another nut to be mounted. The resilient member 80 of course expands to normal condition.

The head 16 of nut N, and the shank 18 thereof, are herein disclosed as hexagonal of contour, by way of example. It is important that shank 18 be multisided rather than cylindrical, in order to present shank corners for displacement against the underside of plate or panel P. Accordingly, the shank may properly be described as polygonal to encompass any number of sides meeting at corners or or edges to be acted upon by die ledges such as 58, 580 or 158, to effect a firm nut anchorage. The term "polygonal" is meant to define a shank of many sides and edges, including such shanks as may be fluted or longitudinally serrated in the manner of a spur gear. The nut head 16, as distinguished from the shank, may be of any shape, but is preferably polygonal to facilitate indexing of the nut with the upper die recess.

I claim:

1. Apparatus for securing upon a mounting plate a pierce nut having a head, and a polygonal shank having sides intersecting to provide corners, and cutting edges on said sides extending between said corners, said apparatus comprising: a die having a plate-supporting surface provided with a die cavity, said cavity having a throat and a communicating slug chamber, said throat having the polygonal shape and approximate size of the nut shank, whereby the cutting edges of the polygonal nut shank are drivable through the plate and into said throat for excising a polygonal slug of a size and shape corresponding to that of the nut shank and forming a polygonal opening in said plate; press means for driving the nut shank first through said throat then into said slug chamber, with advancement of the slug into said slug chamber and with disposition of the nut head in abutment against one face of the plate; and metal deforming means located in the die cavity adjacent said throat and extending across corner regions of said die cavity, to engage and displace the metal of the corners of the nut shank firmly against the remaining face of the plate as said shank advances into the slug chamber.

2. Apparatus for securing upon a mounting plate a pierce nut having a head, and a polygonal shank having sides intersecting to provide corners, and cutting edges on said sides intermediate said corners, said apparatus comprising: a die having a plate-supporting surface provided with a die cavity, said cavity having a throat and a communicating slug chamber, said throat having the polygonal shape and approximate size of the nut shank, whereby the cutting edges of the polygonal nut shank are drivable through the plate and into said throat for excising a polygonal slug and forming a polygonal opening in said plate; press means for driving the nut shank first through said throat then into said slug chamber, with advancement of the slug into said slug chamber and with disposition of the nut head in abutment against one face of the plate; and metal deforming means located with the slug chamber, to engage and displace the metal of the corners of the nut shank firmly against the remaining face of the plate as said shank advances into the slug chamber, said metal deforming means comprising a plurality of impact ledges located within the slug chamber adjacent to opposite corners of the polygonal throat of the die cavity.

3. Apparatus for securing upon a mounting plate a pierce nut having a head, and a polygonal shank having sides intersecting to provide corners, and cutting edges on said sides intermediate said corners, said apparatus comprising: a die having a plate-supporting surface provided with a die cavity, said cavity having a throat and a communicating slug chamber, said throat having the polygonal shape and approximate size of a nut shank, whereby the cutting edges of the polygonal nut shank are drivable through the plate and into said throat for excising a polygonal slug and forming a polygonal opening in said plate; press means for driving the nut shank first through said throat then into said slug chamber, with advancement of the slug into said slug chamber and with disposition of the nut head in abutment against one face of the plate within the slug chamber, to engage and displace the metal of the corners of the nut shank firmly against the remaining face of the plate as said shank advances into the slug chamber and means for reducing the breadth dimensions of the slug during advancement thereof within the chamber.

4. Apparatus as specified by claim 3, wherein is included means for discharge of the reduced slug through the die cavity throat subsequently to mounting of the nut upon the plate aforesaid.

5. Apparatus as specified by claim 2, wherein the slug chamber includes an upstanding dome element over which dome element the slug is deformed while undergoing advancement by said press means, to reduce the breadth dimensions of said slug.

6. Apparatus as specified by claim 5, wherein said dome element is normally fixed within said chamber, and means is provided for dislodging the slug from said dome element.

7. Apparatus as specified by claim 6, wherein the means last mentioned comprises a passageway in the dome element for directing a stream of compressed air against a face of the slug.

8. Apparatus as specified by claim 2, wherein the impact ledges of the metal deforming means are constituted by an annular edge of a cylindrical sleeve disposed within the slug chamber, said annular edge being spaced from the plate-supporting surface of the die a distance approximating the thickness of the mounting plate.

9. Apparatus as specified by claim 8, wherein the inside diameter of the sleeve at said annular edge is of a lesser dimension than the distance across two opposite corners of the polygonal throat.

10. Apparatus as specified by claim 9, wherein is included means for embossing the metal surrounding the polygonal opening of the mounting plate.

11. Apparatus as specified by claim 9, wherein said annular edge of the cylindrical sleeve rests upon the surface of a cone whose apex is located within the confines of the sleeve.

12. Apparatus as specified by claim 8, wherein the slug chamber includes an upstanding dome element over which dome element the slug is deformed while advancing into the slug chamber, to reduce the breadth dimensions of said slug.

13. Apparatus as specified by claim 12, wherein said dome element is normally fixed within said chamber, and means is provided for dislodging the slug from said dome element and said chamber.

14. Apparatus for securing upon a mounting plate a pierce nut having a head, and a polygonal shank having sides intersecting to provide corners, and cutting edges on said sides intermediate said corners, said apparatus comprising: a die having a plate-supporting surface provided with a die cavity, said cavity having a throat and a communicating slug chamber, said throat having the polygonal shape and approximate size of the nut shank, whereby the cutting edges of the polygonal nut shank are drivable through the plate and into said throat for excising a polygonal slug and forming a polygonal opening in said plate; press means for driving the nut shank through said throat and into said slug chamber and with disposition of the nut head in abutment against once face of the plate; and metal deforming means comprising shoulders at spaced corner positions in said cavity to engage and displace the metal of the corners of the nut shank firmly against the remaining face of the plate as said shank advances into the slug chamber.

15. Apparatus for securing upon a mounting plate a pierce nut having a head, and a polygonal shank having sides intersecting to provide corners, and cutting edges on said sides intermediate said corners, said apparatus comprising: a die having a plate-supporting surface provided with a die cavity, said cavity having a throat and a communicating slug chamber, said throat having the polygonal shape and approximate size of the nut shank, whereby the cutting edges of the polygonal nut shank are drivable through the plate and into said throat for excising a polygonal slug and forming a polygonal opening in said plate; press means for driving the nut shank through said throat and into said slug chamber to excise the slug, with advancement of the slug into said slug chamber and with disposition of the nut head in abutment against one face of the plate; metal deforming means to engage and displace the metal of the corners of the nut shank firmly against the remaining face of the plate as said shank advances into the slug chamber, and means for deforming the slug area of the plate to reduce the breadth dimensions of said slug prior to advancement of the slug into said slug chamber.

16. Apparatus for securing upon a mounting plate a pierce nut having a head, and a polygonal shank having sides intersecting to provide corners, and cutting edges on said sides intermediate said corners, said apparatus comprising: a die having a plate-supporting surface provided with a die cavity, said cavity having a throat and a communicating slug chamber, said throat having the polygonal shape and approximate size of the nut shank, whereby the cutting edges of the polygonal nut shank are drivable through the plate and into said throat for excising a polygonal slug and forming a polygonal opening in said plate; press means for driving the nut shank through said throat and into said slug chamber to excise the slug, with advancement of the slug into said slug chamber and with disposition of the nut head in abutment against one face of the plate; metal deforming means to engage and displace the metal of the corners of the nut shank firmly against the remaining face of the plate as said shank advances into the slug chamber, and means for deforming the slug, comprising a plunger having a projectile end, and means for driving said plunger end forcefully against the slug area of the plate to convex said slug area substantially simultaneously with excision of the slug.

17. Apparatus as specified by claim 16, wherein said slug chamber has a through opening for discharge of the slug in the direction of advancement of said plunger.

18. Apparatus as specified by claim 14, wherein said plunger includes a plunger head, and said press means includes a reciprocable driver movable against said head to advance the plunger; a member to overlie the nut; and yielding means intermediate said plunger head and said member, to transmit a portion only of the plunger head advancement to said member overlying the nut.

19. Apparatus as specified by claim 18, wherein said yielding means comprises a mass of resilient rubber like material.

PO-1050
(5/69)

UNITED STATES PATENT OFFICE
CERTIFICATE OF CORRECTION

Patent No. 3,602,974　　　　　　　　　Dated Sept. 7, 1971

Inventor(s) ALBERT C. KOETT

It is certified that error appears in the above-identified patent and that said Letters Patent are hereby corrected as shown below:

IN THE SPECIFICATION:
Col. 1, line 15, after "economically" insert --and--;
Col. 2, line 37, change "received" to --receives--;
Col. 2, line 47, change "front" to --from--;
Col. 3, line 62, change "am" to --an--;
Col. 3, line 65, change "clock" to --block--;
Col. 4, line 39, after "corners" delete "or" (second occurrence);

IN THE CLAIMS:
Col. 5, line 8, after "located" change "with" to --within--;
Col. 5, line 28, after "plate" insert --metal deforming
　　　　　　　　　means located--.

Signed and sealed this 14th day of March 1972.

(SEAL)
Attest:

EDWARD M.FLETCHER,JR.　　　　　　　ROBERT GOTTSCHALK
Attesting Officer　　　　　　　　　 Commissioner of Patents